(12) United States Patent
Paik et al.

(10) Patent No.: US 9,854,152 B2
(45) Date of Patent: Dec. 26, 2017

(54) AUTO-FOCUS SYSTEM FOR A DIGITAL IMAGING DEVICE AND METHOD

(71) Applicants: SK hynix Inc., Gyeonggi-do (KR); Chungang University Industry Academic Cooperation Foundation, Seoul (KR)

(72) Inventors: Joon Ki Paik, Seoul (KR); Yoon Jong Yoo, Seoul (KR); Jin Beum Jang, Gyeonggi-do (KR); Jong Heon Kim, Gyeonggi-do (KR); Jae Hyun Im, Seoul (KR); Jae Hwan Jeon, Seoul (KR); Wan Hee Jo, Seoul (KR)

(73) Assignees: SK Hynix Inc., Gyeonggi-do (KR); Chungang University Industry Academic Cooperation Foundation, Seoul (KR)

( * ) Notice: Subject to any disclaimer, the term of this patent is extended or adjusted under 35 U.S.C. 154(b) by 14 days.

(21) Appl. No.: 15/140,202

(22) Filed: Apr. 27, 2016

(65) Prior Publication Data

US 2017/0180627 A1    Jun. 22, 2017

(30) Foreign Application Priority Data

Dec. 16, 2015    (KR) .................. 10-2015-0180365

(51) Int. Cl.
| | |
|---|---|
| *H04N 5/232* | (2006.01) |
| *G06K 9/62* | (2006.01) |
| *H04N 5/225* | (2006.01) |
| *G06T 7/60* | (2017.01) |
| *G06K 9/52* | (2006.01) |

(Continued)

(52) U.S. Cl.
CPC .......... *H04N 5/23212* (2013.01); *G06K 9/52* (2013.01); *G06K 9/6215* (2013.01); *G06T 7/0042* (2013.01); *G06T 7/2033* (2013.01); *G06T 7/60* (2013.01); *H04N 5/2254* (2013.01); *H04N 5/3696* (2013.01); *H04N 9/04* (2013.01); *G06K 2009/4666* (2013.01); *G06T 2207/30168* (2013.01)

(58) Field of Classification Search
CPC .... H04N 5/23212; H04N 5/2254; H04N 9/04; G06K 9/6215; G06K 9/52; G06T 7/0042; G06T 7/2033; G06T 7/60
See application file for complete search history.

(56) References Cited

U.S. PATENT DOCUMENTS

2010/0194897 A1\*  8/2010  Yumiki .................. G03B 7/091
                                                                    348/208.4
2012/0133821 A1   5/2012  Takaiwa
(Continued)

FOREIGN PATENT DOCUMENTS

| | | |
|---|---|---|
| JP | 2013-152388 | 8/2013 |
| JP | 2014-182237 | 9/2014 |

*Primary Examiner* — David F Dunphy
(74) *Attorney, Agent, or Firm* — IP & T Group LLP

(57) ABSTRACT

The present invention relates to an auto-focus system and method based on a sensor, using hierarchical extraction and motion estimation for an image. The auto-focus method may include the steps of: (a) extracting a phase difference image from a sensed image; (b) extracting a robust feature image which satisfies a preset reference with respect to noise and out-of-focus blur, from the phase difference image; and (C) estimating a motion vector for lens shift from the feature image.

19 Claims, 6 Drawing Sheets

(51) Int. Cl.
  *H04N 9/04* (2006.01)
  *G06T 7/20* (2017.01)
  *G06T 7/00* (2017.01)
  *H04N 5/369* (2011.01)
  *G06K 9/46* (2006.01)

(56) References Cited

U.S. PATENT DOCUMENTS

| | | | |
|---|---|---|---|
| 2013/0107067 A1* | 5/2013 | Miyakoshi | H04N 5/23212 348/208.5 |
| 2013/0235253 A1 | 9/2013 | Onuki et al. | |
| 2013/0271646 A1 | 10/2013 | Hamano | |
| 2013/0335606 A1* | 12/2013 | Aoki | G02B 7/34 348/296 |
| 2015/0296125 A1* | 10/2015 | Kusaka | G02B 7/34 348/349 |
| 2015/0334297 A1* | 11/2015 | Matsui | H04N 5/23232 348/222.1 |
| 2015/0381878 A1* | 12/2015 | Mishima | H04N 5/2356 348/241 |

* cited by examiner

Down Sampled Layer    Gaussian Blurred Layer

AUTO-FOCUS SYSTEM FOR A DIGITAL IMAGING DEVICE AND METHOD

CROSS-REFERENCE TO RELATED APPLICATIONS

The present application claims priority of Korean Patent Application No. 10-2015-0180365, filed on Dec. 16, 2015, which is incorporated herein by reference in its entirety.

BACKGROUND

1. Field

Exemplary embodiments of the present invention relate generally to an auto-focus technology for a digital imaging device and more particularly, an auto-focus system and method based on a sensor using hierarchical feature extraction and motion estimation for an image.

2. Description of the Related Art

The auto-focus technology is one of the most important technologies for acquiring a clear image in an image acquisition process of a digital imaging device, such as a camera.

The auto-focus technology may be generally classified in active methods which directly measure a distance using an additional signal, and passive methods which measure a distance by analyzing light transmitted through a lens.

Active methods generally employ a module for auto-focus, and calculate a focal distance based on the time required for a specific signal which is emitted by the camera to return to the camera after it is reflected on an object. The passive method calculates a distance by analyzing a light source of a visible area, which is reflected from an object and transmitted to the camera.

The passive method may be generally divided into a Contrast Detection Auto-Focus (CDAF) method and a Phase Detection Auto-Focus (PDAF) method. All of the auto-focus methods are currently applied to digital cameras.

Recently, much attention has been paid to a hybrid auto-focus method which combines the advantages of the active method and the passive method.

The hybrid auto-focus method primarily determines an in-focus state using the active method or the PDAF method, and secondarily provides a clear in-focus image using the CDAF method which generally may provide better precision.

In the hybrid auto-focus method, the primary auto-focus method is very important in determining the computing speed of the auto-focus system. That is because, in the primary auto-focus method, the lens needs to be as close as possible to the in-focus state, in order to minimize repetitive motions of the lens in the CDAF method which is used as the secondary auto-focus method.

For the hybrid auto-focus method, research has been recently conducted on a focus method in which pixels for calculating a phase difference are mounted in an imaging sensor.

In this method, two measuring point pixels used for auto-focus are covered with a black mask so as to receive different phases.

However, due to the black mask which is separately mounted on the pixels in order to define different phases, the amount of light received by the measuring point pixels is smaller than the amount of light received by other pixels, and out-of-focus blur exists in an image inputted to the camera.

Under such a condition, it is very difficult to detect a feature and to acquire a reliable phase difference. Thus, there is a demand for a method which is capable of extracting a reliable phase difference image, calculating an accurate phase difference through the phase difference image, and estimating a motion.

Japanese Patent Laid-Open Publication NO. 2014-182237, Japanese Patent Laid-Open Publication NO. 2013-152388, US Publication NO. 2013-0271646, US Publication No. 2013-0235253 and US Publication No. 2012-0133821 describe generally autofocus systems for digital cameras.

SUMMARY

Various embodiments are directed to an auto-focus system and method based on a sensor, which is capable of extracting a reliable phase difference image.

Also, various embodiments are directed to an auto-focus system and method based on a sensor, which is capable of estimating a motion by extracting a strong feature from a phase difference image.

Also, various embodiments are directed to an auto-focus system and method based on a sensor, which is capable of minimizing repetitive motions of a lens for in-focused image through motion estimation.

In an embodiment, an auto-focus system may include: a sensing unit suitable for sensing an image; and an auto-focus control unit suitable for extracting a phase difference image from the image, extracting a strong feature image from the phase difference image, and estimating a motion vector for lens shift from the feature image.

The auto-focus control unit may be suitable for extracting the feature image satisfying a preset reference with respect to noise and out-of-focus blur.

The auto-focus control unit may include: a phase difference image extraction unit suitable for selecting a predetermined interest area in the image, and extracting first and second phase difference images in response to an image of the interest area and a predefined measuring point pattern image; a feature extraction unit suitable for acquiring a first difference image and a second difference image in response to any one of the first and second phase difference images, acquiring the coordinate of a predefined area using the first and second difference images, and extracting the feature image corresponding to the coordinate from the first and second phase difference images; and a motion estimation unit suitable for estimating the motion vector in the feature image.

The phase difference image extraction unit may include: an interest area setting unit suitable for setting the interest area having a predefined position and size in the image; an operation unit suitable for taking an image of an measuring point position based on the image of the interest area and the measuring point pattern image; and an image sampling unit suitable for acquiring the first and second phase difference images by sampling the image of the measuring point position.

The feature extraction unit may be suitable for acquiring the first difference image being resistant to noise and the second difference image being resistant to out-of-focus blur.

The feature extraction unit is suitable for acquiring the coordinate of the predefined area having a strong feature using the first and second difference images.

The feature extraction unit may include: a Difference of Gaussian (DoG) unit suitable for acquiring the first difference image by applying a Difference of Gaussian (DoG) scheme to the first phase difference image; a multi-scale image difference unit suitable for acquiring the second difference image by applying a difference scheme between images reconstructed by a pyramid method to the first phase difference image; an arithmetic unit suitable for summing the first difference image and the second difference image and acquiring the coordinate of the predefined area; and a feature image generation unit suitable for extracting the feature image including first and second feature images corresponding to the coordinate from the first and second phase difference images.

The motion estimation unit may estimate the motion vector using at least one of phase correlation, block matching, and hierarchical interpolation, in response to the feature image.

In an embodiment, an auto-focus method may include: extracting a phase difference image from an image; extracting a strong feature image from the phase difference image; and estimating a motion vector for lens shift from the feature image.

The step extracting of the phase difference image may include: selecting a predefined interest area in the image; and extracting first and second phase difference images in response to an image of the interest area and a predefined measuring point pattern image.

The step extracting of the phase difference image may include: reconstructing the image into an image of an interest area having a predefined position and size; acquiring an image of an measuring point position based on the image of the interest area and the measuring point pattern image; and acquiring the first and second phase difference images by sampling the image of the measuring point position.

The extracting of the feature image may include extracting the feature image which satisfies a preset reference with respect to noise and out-of-focus blur, from the phase difference image.

The extracting of the feature image may include: acquiring a first difference image by applying a Difference of Gaussian (DoG) scheme to the first phase difference image; acquiring a second difference image by applying a difference scheme between images reconstructed by a pyramid method to the first phase difference image; acquiring the coordinate of the predefined area strong based on the first and second difference images; and extracting the feature image including first and second feature images corresponding to the coordinate from the first and second phase difference images.

The estimating of the motion vector may include estimating the motion vector in the feature image, using at least one of phase correlation, block matching, and hierarchical interpolation.

DETAILED DESCRIPTION

Hereinafter, various embodiments of the invention including an auto-focus system and method for a digital camera will be described in detail with reference to the accompanying drawings.

While describing the present invention, detailed descriptions related to publicly well-known functions or configurations will not be repeated herein in order not to unnecessarily obscure the subject matter of the present invention.

The terms such as first and second can be used to describe various elements. However, the components are not limited by these terms, and these terms are used only to distinguish one element from another element.

Figure 1A:
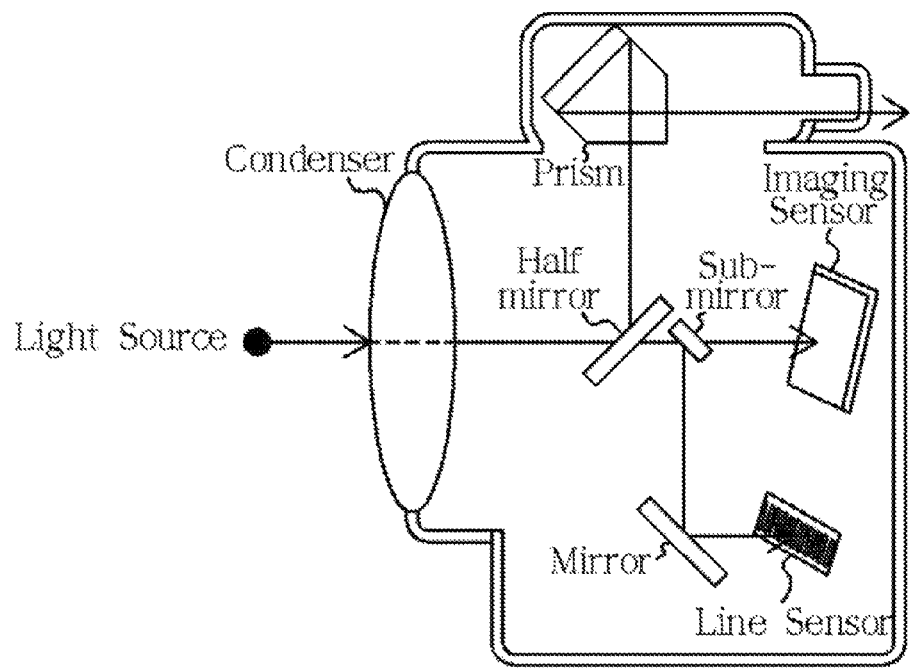
FIGS. 1A and 1B are diagrams illustrate a conventional phase difference auto-focus method.
Figure 1B:
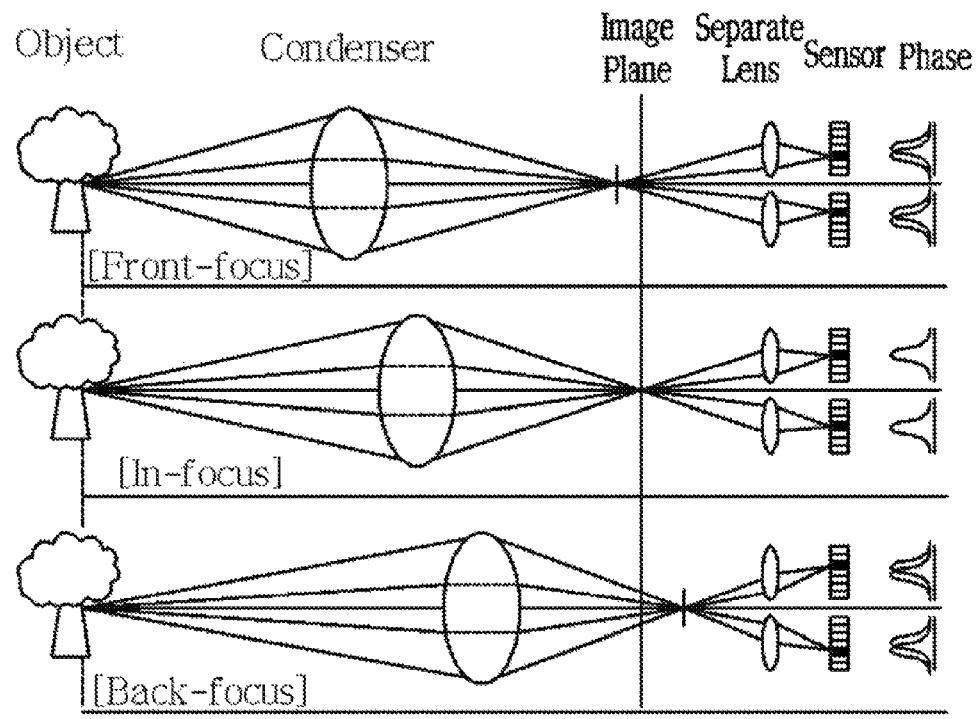

FIGS. 1A and 1B are diagrams illustrating a conventional phase difference auto-focus method for a digital camera.

FIG. 1A illustrates a process in which a light source transmitted through a lens is split into two lights formed in an imaging sensor and a line sensor, respectively, through a half mirror and one of a sub-mirror or a mirror.

FIG. 1B illustrates a process in which light is separated through a separate lens and formed in a sensor. When out-of-focus blur exists, a symmetrical image is formed with respect to the center of each line sensor.

The Phase Detection Auto-Focus (PDAF) method calculates a phase difference through a line sensor and adjusts a focus according to the phase difference.

Most Digital Single Lens Reflex (DSLR) cameras employ a separate line sensor for calculating a phase difference through a signal of the line sensor, and estimate the direction and extent of focusing in response to the phase difference.

Since the PDAF method calculates a phase difference through a light source formed on a separate line sensor, the PDAF method may rapidly determine the in-focus position of the lens with respect to a target object.

However, the PDAF method requires many separate devices for transmitting light to the line sensor. When the hardware structure, such as the half mirror or the separate lens, is varied from the initial structure due to an external impact, the PDAF method cannot acquire an accurate focus.

Figure 2A:
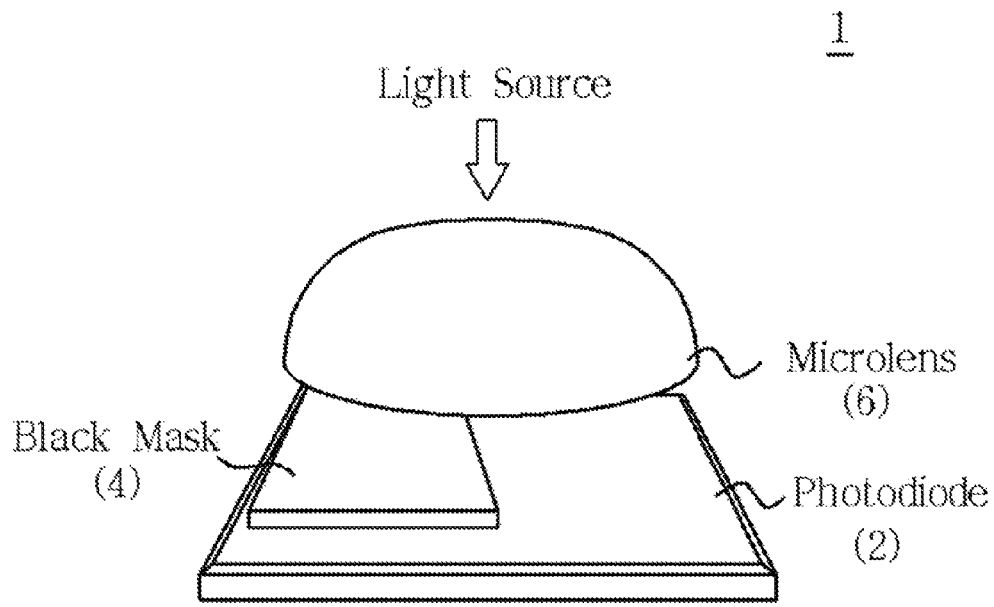
FIGS. 2A, 2B and 3 are diagrams illustrating the structure of a sensor which is applied to an auto-focus system, according to an embodiment of the present invention.
Figure 2B:
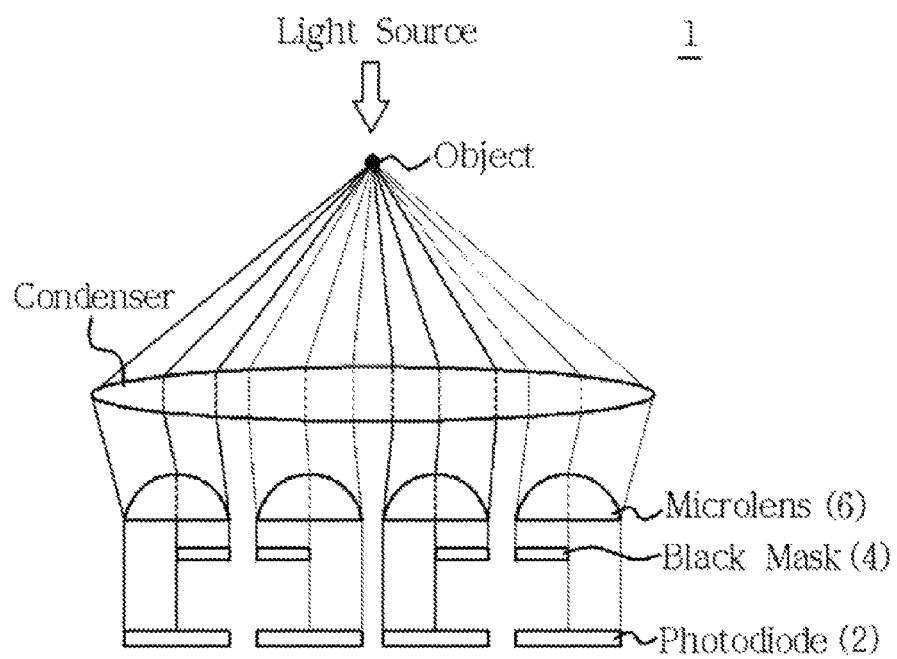
Figure 3:
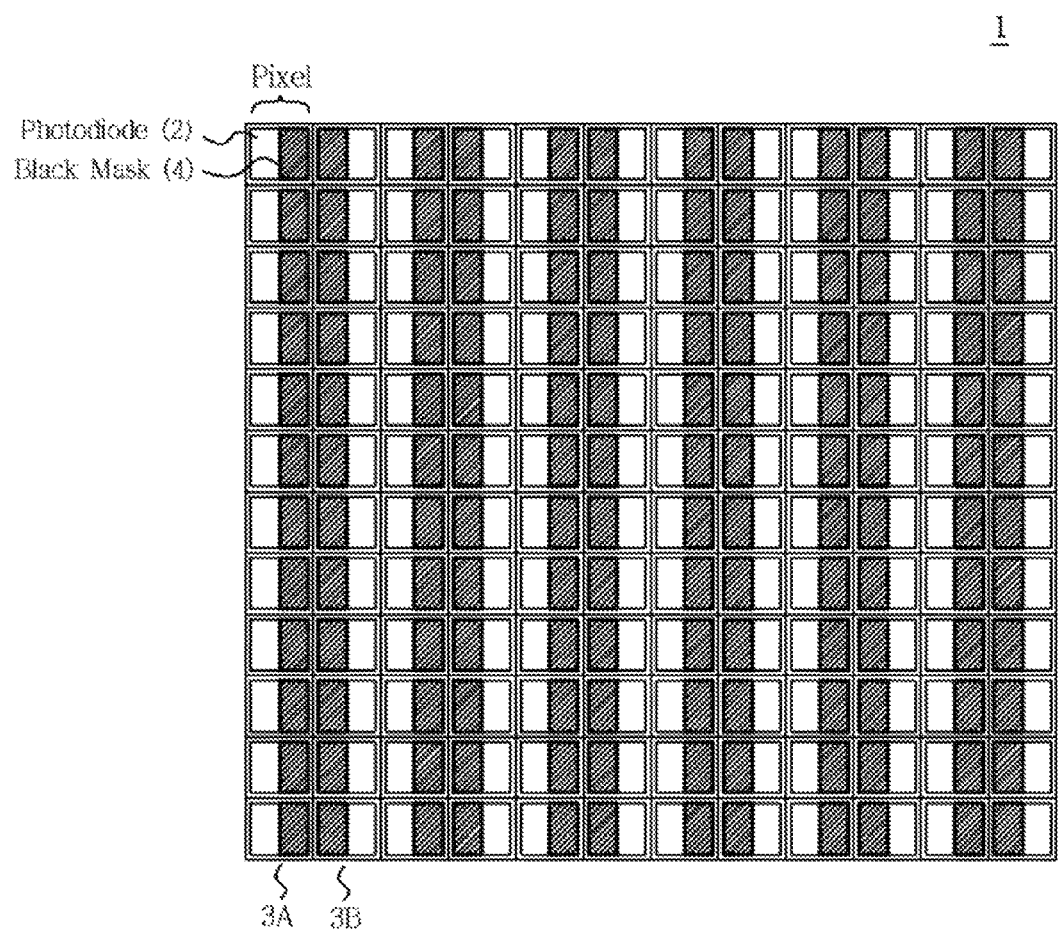

FIGS. 2A, 2B and 3 are diagrams illustrating the structure of a sensor 1 which is applied to an auto-focus system, according to an embodiment of the present invention.

Referring to FIGS. 2A, 2B and 3, the sensor 1 according to the embodiment of the present invention, may use all pixels as measuring points for detecting a phase difference.

As illustrated in FIGS. 2A and 2B, the sensor 1 may include a photodiode 2, a black mask 4, and a microlens 6 in each pixel. The photodiode 2 is utilized as a measuring point for receiving a light source, the black mask 4 is installed in front of the photodiode 2, and the microlens 6 is installed in front of the photodiode 2 and the black mask 4.

Referring to FIG. 3, the sensor 1 according to the embodiment of FIG. 2 may utilize all pixels as measuring points for acquiring a phase image. For example, the pixels may be arranged in a Bayer Color Filter Array (CFA) Blue, Green, Green, Red (BGGR) structure. Among the pixels, an odd-numbered pixel 3A in the horizontal direction may include a photodiode 2 arranged in the left side thereof and a black mask 4 arranged in the right side thereof, and an even-numbered pixel 3B in the horizontal direction may include a photodiode 2 arranged in the right side thereof and a black mask 4 arranged in the left side thereof.

An image obtained through a camera including the sensor 1 with the above-described structure may be defined as the following out-of-focus blur model.

$$g(x, y) = g_L(x, y) + g_R(x, y), \quad (1)$$

$$\text{where } \begin{cases} g_L(x, y) = f(x, y) * h_L(x, y) + \eta(x, y) \\ g_R(x, y) = f(x, y) * h_R(x, y) + \eta(x, y) \end{cases},$$

In Equation 1, g(x, y) represents an acquired image, f(x, y) represents an ideal image with no out-of-focus blur, acquired from a Bayer pattern, $g_L(x, y)$ and $g_R(x, y)$ represent left and right phase images with out-of-focus blur, respectively, $h_L(x, y)$ and $h_R(x, y)$ represent the focus degradation functions of $g_L(x, y)$ and $g_R(x, y)$, respectively, $\eta(x, y)$ represents a noise image, and (x, y) represents the coordinate of the image.

Figure 4:
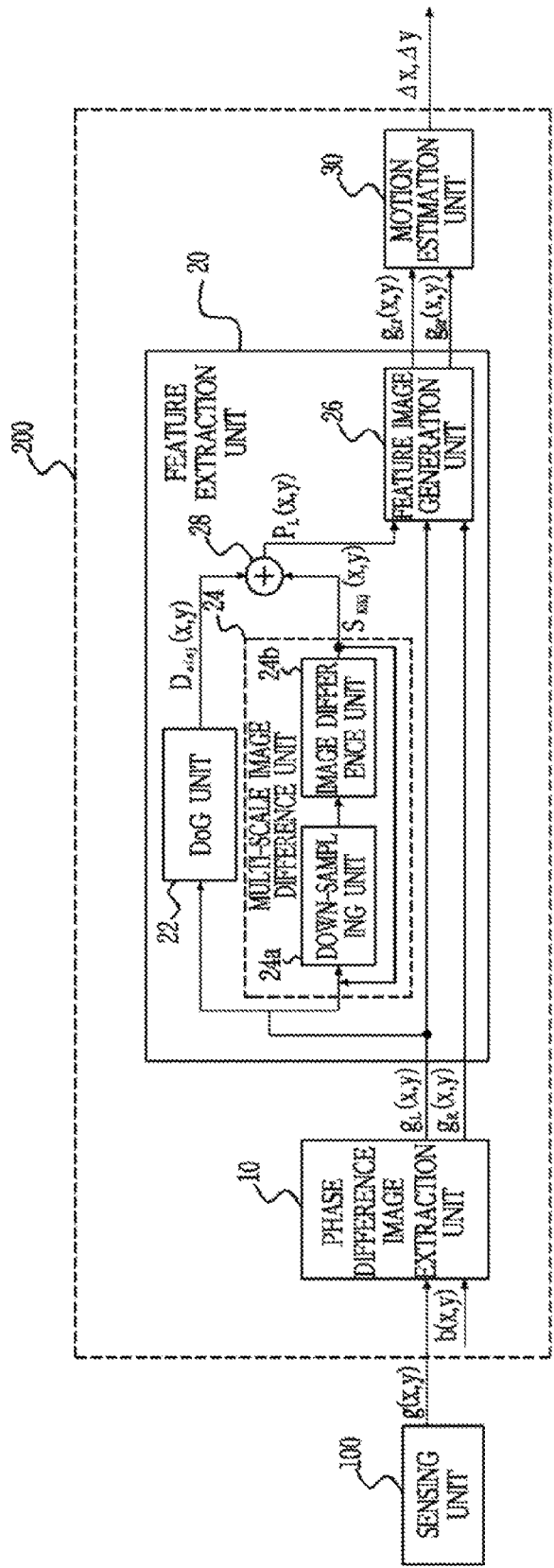
FIG. 4 is a block diagram illustrating an auto-focus system, according to an embodiment of the present invention.

FIG. 4 is a block diagram illustrating an auto-focus system, according to an embodiment of the present invention.

Referring to FIG. 4, the auto-focus system, according to an embodiment of the present invention, includes a sensing unit 100 and an auto-focus control unit 200.

The sensing unit 100 senses an image and provides the sensed image to the auto-focus control unit 200. The auto-focus control unit 200 extracts a phase difference image from the image provided from the sensing unit 100, extracts a feature image resistant to noise and out-of-focus blur from the phase difference image, and estimates a motion vector for lens shift from the feature image.

The auto-focus control unit 200 may include a phase difference image extraction unit 10, a feature extraction unit 20, and a motion estimation unit 30.

The phase difference image extraction unit 10 generates left and right phase images $g_L(x, y)$ and $g_R(x, y)$ in response to a defocused image g(x, y) and an image b(x, y) defining measuring points. At this time, b(x, y) represents a predefined measuring point pattern image, and $g_L(x, y)$ and $g_R(x, y)$ represent extracted left and right phase images, respectively.

The feature extraction unit 20 redefines interest areas of two phase images based on a strong feature point extracted from one of the phase images (e.g., the left phase image), and extracts strong feature points from the noise of an image and a defocused image, using the Difference of Gaussian (DoG) algorithm and a difference scheme between images reconstructed through a pyramid method in image processing.

The feature extraction unit 20 may include a Difference of Gaussian (DoG) unit 22, a multi-scale image difference unit 24, an arithmetic unit 28, and a feature image generation unit 26.

The DoG unit 22 acquires a difference image resistant to noise by applying the DoG algorithm to the left phase difference image. The multi-scale image difference unit 24 acquires a difference image resistant to out-of-focus blur by applying the difference scheme to images reconstructed through a pyramid method. The arithmetic unit 28 sums the difference images provided from the DoG unit 22 and the multi-scale image difference unit 24, and acquires the coordinate of an area with a strong feature. The feature image generation unit 26 extracts feature images from the phase difference images, based on the coordinate of the area with a strong feature.

The motion estimation unit 30 calculates a motion vector (Δx, Δy) in response to phase correlation between two images $g_L(x, y)$ and $g_R(x, y)$ acquired as the feature extraction result by the feature extraction unit 20. The motion vector (Δx, Δy) is used to shift a lens for acquiring an in-focused image.

The auto-focus system and method according to an embodiment of the present invention will be described in more detail as follows. First, the process of acquiring a phase difference image from an image acquired through the sensor will be described.

Figure 5:
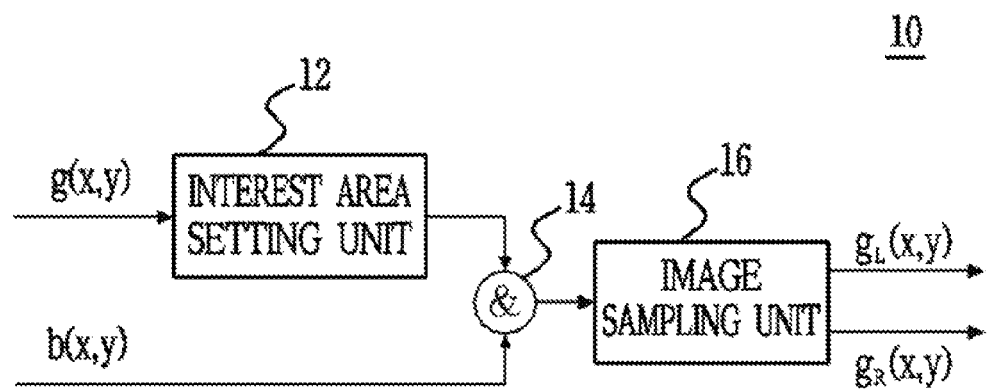
FIG. 5 is a block diagram illustrating a phase difference image extraction unit.

FIG. 5 is a block diagram illustrating an example of the phase difference image extraction unit 10 of FIG. 4 according to an embodiment of the invention.

Referring to FIG. 5, the phase difference image extraction unit 10 may include an interest area setting unit 12, an operation unit 14, and an image sampling unit 16.

The interest area setting unit 12 sets the image g(x, y) sensed through the sensing unit 100 to the position and size of a predefined interest area. The operation unit 14 performs an AND operation on the image of the interest area and the measuring point pattern image b(x, y). The image sampling unit 16 acquires phase difference images $g_L(x, y)$ and $g_R(x, y)$ by sampling an output image of the operation unit 14.

The phase difference image extraction unit 10 generates the left phase image $g_L(x, y)$ from the pixels in the odd-numbered columns, based on the Bayer CFA BGGR structure of the sensor of the sensing unit 100. The phase difference image extraction unit 10 also generates the right phase image $g_R(x, y)$ from the pixels in the even-numbered columns, based on the Bayer CFA BGGR structure of the sensor of the sensing unit 100. At this time, b(x, y) represents the predefined measuring point pattern image, and $g_L(x, y)$ and $g_R(x, y)$ represent the extracted left and right phase images, respectively.

As described above, the phase difference image extraction unit 10 reconstructs the image g(x, y) acquired through the sensor based on the position and size of the predefined interest area, and acquires only information of the measuring point positions by performing an AND operation on g(x, y) and b(x, y). Furthermore, the phase difference image extraction unit 10 defines the x and y axes of the respective measuring points, and extracts the left and the right phase images $g_L(x,y)$ and $g_R(x, y)$ by sampling the image of the operation unit 14.

Next, the process of extracting a strong feature from the phase difference images will be described.

When an image is taken through the sensor having the structure illustrated in FIGS. 2 and 3, the amount of light transmitted to the sensor decreases. Thus, the image g(x, y) acquired through the sensor is a low-luminance image which has lower brightness than the ideal image f(x, y) with no out-of-focus blur in the Bayer pattern.

Therefore, the left phase image $g_L(x, y)$ and the right phase image $g_R(x, y)$ are also low-luminance images, and the first derivative values of the two images are smaller than the first derivative value of ideal image f(x, y). Furthermore, when the ISO sensitivity is raised in the low-luminance environment, the proportion of noise increases in g(x, y) due to the influence of $\eta(x, y)$. When an image reflected from an object is not an in-focused image, the image g(x, y) has out-of-focus blur due to convolution with h(x, y).

For solving the above-described problem, the feature extraction unit 20 performs DoG on $g_L(x, y)$ to obtain a high-frequency component resistant to noise. The result obtained by performing DoG may be expressed as Equation 2 below.

$$D_{\sigma_i,\sigma_{i+1}}(x, y) = \sum_{u=-k}^{k} \sum_{v=-s}^{s} h_{\sigma_i}(u, v)g_L(x+u, y+v) - \sum_{u=-k}^{k} \sum_{v=-s}^{s} h_{\sigma_j}(u, v)g_L(x+u, y+v) \quad (2)$$

In Equation 2, $\sigma_i$ represents a size variable of the Gaussian function, represents a coefficient of a Gaussian kernel, and k and s represents neighboring pixels of x and y. Furthermore, $D_{\sigma_i,\sigma_{i+1}}(x,y)$ is normalized to a value between 0 and 0.5, in order to satisfy Equation 3 below.

$$\tilde{D}_{\sigma_i,\sigma_{i+1}}(x, y) = \frac{D_{\sigma_i,\sigma_j}(x, y) - \min\{D_{\sigma_i,\sigma_j}(x, y)\}}{\max\{D_{\sigma_i,\sigma_j}(x, y)\} - \min\{D_{\sigma_i,\sigma_j}(x, y)\}} \times 0.5 \quad (3)$$

In order to extract a feature resistant to out-of-focus blur, the feature extraction unit 20 uses a difference image between two images with different size variables, the difference image being acquired by down-sampling the two images and then up-sampling the down-sampled images. The difference image between the two images with different size variables is defined as follows.

$$S_{K_i K_j}(x, y) = \frac{1}{\kappa_i^2} \sum_{u=0}^{\kappa_i-1} \sum_{v=0}^{\kappa_i-1} g_L(x/\kappa_i + u, y/\kappa_i + v) - \frac{1}{\kappa_j^2} \sum_{u=0}^{\kappa_j-1} \sum_{v=0}^{\kappa_j-1} g_L(x/\kappa_j + u, y/\kappa_j + v) \quad (4)$$

In Equation 4, $k_j$ represents a size variable, and $S_{K_i,K_j}(x, y)$ represents the result image. Since an arithmetic mean filter was applied according to the sampling size variable, noise of $S_{K_i,K_j}(x,y)$ is reduced, and $S_{K_i,K_j}(x,y)$ has strong edge information through repetitive sampling. Furthermore, $S_{K_i,K_j}(x,y)$ is also normalized as follows.

$$\tilde{S}_{K_i,K_j}(x, y) = \frac{S_{K_i,K_j}(x, y) - \min\{S_{K_i,K_j}(x, y)\}}{\max\{S_{K_i,K_j}(x, y)\} - \min\{S_{K_i,K_j}(x, y)\}} \times 0.5 \quad (5)$$

The feature extraction unit 20 detects the most strong edge component by summing the above-described two images. The image obtained by summing the two images may be defined as follow.

$$p_L(x,y) = \tilde{D}_{\sigma_i,\sigma_j}(x,y) + \tilde{S}_{K_i,K_j}(x,y) \quad (6)$$

In Equation 6, $p_L(x, y)$ represents a result obtained by adding brightness values. Since $\tilde{D}_{\sigma_i,\sigma_j}(x,y)$ and $\tilde{S}_{K_i,K_j}(x,y)$ were normalized to a value between 0 and 0.5 in Equations 3 and 5, $p_L(x, y)$ has a value between 0 and 1.

At this time, $\tilde{D}_{\sigma_i,\sigma_j}(x,y)$ has an effect of suppressing noise in a low-luminance image, but has difficulties in extracting a feature point from a defocused image. On the other hand, $\tilde{S}_{K_i,K_j}(x,y)$ is suitable for extracting a feature point from a defocused image, but is also relatively vulnerable to noise.

Thus, a pixel having a brightness value close to 1 in $p_L(x, y)$ may be set to be a feature point. Finally, as the coordinate of an area having a strong feature is acquired from $p_L(x, y)$, an image $g_{Lf}(x, y)$ is cut and acquired from $g_L(x, y)$ based on the acquired coordinate. The image $g_{Rf}(x, y)$ is also acquired from the image $g_R(x, y)$, based on the acquired coordinate.

Figure 6:
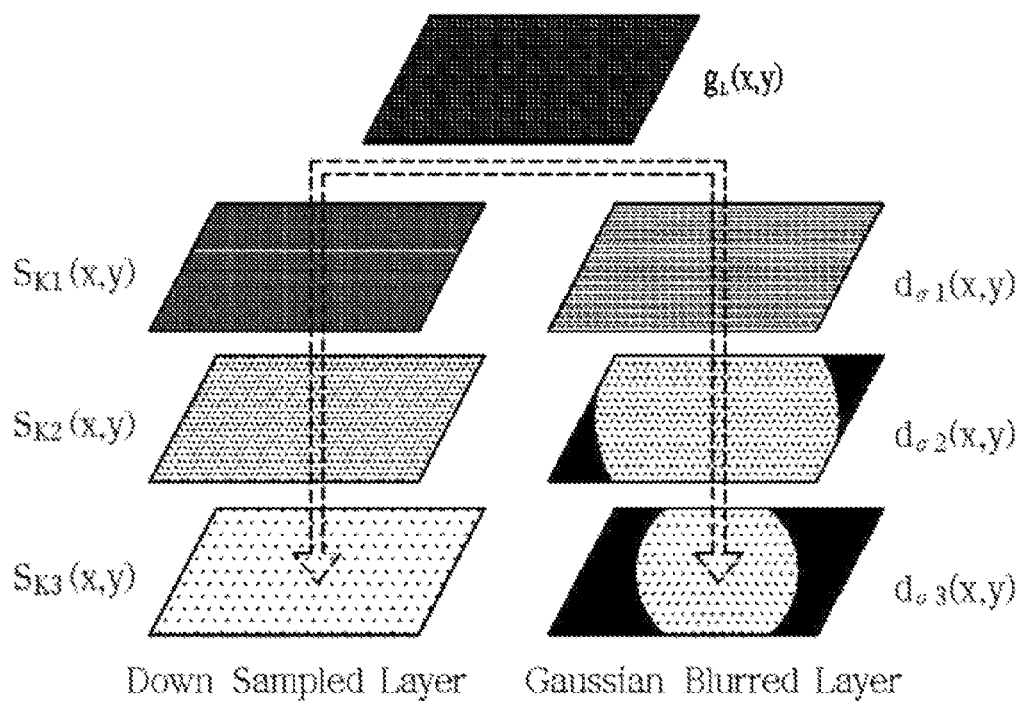
FIG. 6 is a diagram illustrating an extraction process of a feature extraction unit, according to an embodiment of the present invention.

FIG. 6 is a diagram illustrating the feature extraction process of the feature extraction unit 20 of FIG. 4, according to an embodiment of the invention The auto-focus system according to an embodiment of the present invention extracts a feature image by adjusting size variables $\sigma_i$ and $k_j$ of the Gaussian function.

Referring to FIG. 6, the feature extraction unit 20 adjusts the size variable $k_j$, and extracts hierarchical down-sampled images from $g_L(x, y)$. Since $S_{K_i,K_j}(x,y)$ is a difference result between two images having different size variables $K_j$, $K_j$ and $K_{j+1}$ may have a relation of an integer multiple. In the present embodiment, a relation of $2K_j=K_{j+1}$ is defined.

The feature extraction unit 20 extracts hierarchical blurred images from $g_L(x, y)$ according to the size variable $\sigma_i$ of the Gaussian function. Furthermore, $D_{\sigma_i,\sigma_j}(x,y)$ determines the strength of the edge according to the difference between $\sigma_i$ and $\sigma_{i+1}$. In the present embodiment, a relation of $5\sigma_i=\sigma_{i+1}$ may be established in order to detect a strong edge.

Figure 7:
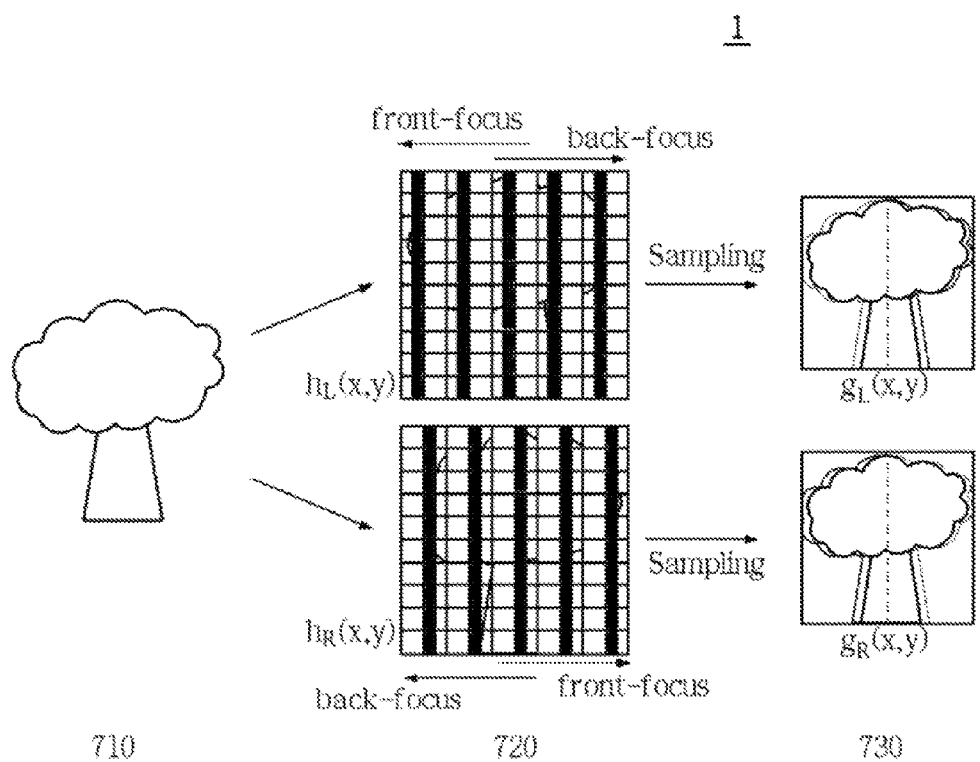
FIG. 7 is a diagram illustrating a process of generating a phase difference image, according to an embodiment of the present invention.

FIG. 7 is a diagram illustrating a process of generating a phase difference image, according to an embodiment of the invention.

Referring to FIGS. 3 and 7, when the black mask 4 is installed in the right side of the photodiode 2, the light source is gathered in the left side of the photodiode 2. When the black mask 4 is installed in the left side of the photodiode 2, the light source is gathered in the right side of the photodiode 2.

When the initial input image g(x, y) is sampled according to the measuring points, two phase images are obtained, the two phase images having horizontal axis information which is symmetrically spread due to the black masks, and high-frequency components of the two phase images have a difference with respect to the horizontal axis. In the case of the vertical axis, however, light is formed in the photodiodes across the whole vertical components of the pixels. Therefore, a phase difference caused by the black mask 4 does not exist between the two phase images.

As illustrated in 710 of FIG. 7, light reflecting from an object is inputted to the camera. As illustrated in 720 of FIG. 7, two images $g_L(x, y)$ and $g_R(x, y)$ degraded by the focus degradation functions $h_L(x, y)$ and $h_R(x, y)$ are sampled in the odd-numbered columns and the even-numbered columns of the sensor 1, respectively.

As illustrated in 730 of FIG. 7, the angle at which the object is observed by the pixels of the odd columns is different from the angle at which the object is observed by the pixels of the even columns. Thus, a phase difference occurs according to the respective focus states. Furthermore, since the measuring point pairs of the sensor 1 are positioned at an interval of one pixel, a decimal phase difference occurs.

The auto-focus system according to an embodiment of the present invention may use one of phase correlation and block matching, in order to estimate a motion vector, and uses hierarchical interpolation in order to perform decimal calculation.

First, the use of phase correlation for motion estimation will be described.

In order to calculate the power spectrum of a feature image, two feature images are Fourier-transformed, and the cross correlation therebetween is calculated. The cross correlation between the two feature images which are Fourier-transformed is defined as follows.

$$E_{PC}(\mu, v) = \frac{\Im\{g_{Rf}(x, y)\} \times \Im\{g^*_{Lf}(x, y)\}}{|\Im\{g_{Rf}(x, y)\} \times \Im\{g^*_{Lf}(x, y)\}|} \quad (7)$$

In Equation 7, (μ, v) represents a frequency spatial coordinate corresponding to (x, y), $g^*_{Lf}(x,y)$ represents a conjugate result of $g_{Lf}(x,y)$, $\Im\{g_{Rf}(x,y)\}$ and $\Im\{g^*_{Lf}(x,y)\}$ represent Fourier transform results of $g_{Rf}(x,y)$ and $g^*_{Lf}(x,y)$, respectively, and $E_{PC}(\mu,v)$ represents a result obtained by calculating cross-correction. Then, $E_{PC}(\mu,v)$ is reverse Fourier transformed, and the maximum point is acquired as a motion vector.

The motion vector is defined as follows.

$$(\Delta x, \Delta y) = \max[\Im\{E_{PC}(\mu, v)\}] \quad (8)$$

In Equation 8, $\Im^{-1}\{E_{PC}(\mu,v)\}$ represents a result obtained by reverse-Fourier-transforming $E_{PC}(\mu,v)$, and (Δx, Δy) represents a phase difference between two phase images. The result of $\Im^{-1}\{E_{PC}(\mu,v)\}$ indicates the extent of motion at the spatial coordinate (x, y). Thus, the final motion coordinate of the two images becomes the position at which $\Im^{-1}\{E_{PC}(\mu,v)\}$ has the largest value. That is, when high-frequency components of the two images exist at the same pixel position, a relation of (Δx, Δy)=(0, 0) is established.

Next, the use of block matching for motion estimation will be described as follows.

The block matching method measures a displacement by evaluating spatial coordinates on a block basis, unlike the phase correlation method. The block matching method compares the brightness values of pixels included in a block of one image to another image, selects the block of the compared image, in which the compared pixels have the smallest error, and thus estimates the motions of two blocks.

The block matching method may be divided into three steps. First, an evaluation method for matching two images is defined. Second, a search strategy for a comparison area for moving a block is established. Finally, the size of the block is determined to establish a hierarchical or adaptive strategy.

The block evaluation method used at the first step includes Minimum mean Square Error (MSE), Mean Absolute Difference (MAD), and Sum of Absolute Difference (SAD). In the present embodiment, the SAD is used in order to guarantee the reliability of the absolute difference of each pixel difference.

The SAD may be defined as follows.

$$SAD(d_1, d_2) = \sum_{(n_1, n_2) \in B} |s_1(n_1, n_2) - s_2(n_1 + d_1, n_2 + d_2)| \quad (9)$$

In Equation 9, $(d_1, d_2)$ represents a displacement vector of two comparison images, $(n_1, n_2)$ represents a reference pixel to be compared, $s_1(n_1, n_2)$ represents a reference image, and $s_2(n_1, n_2)$ represents an image to be compared.

When the search strategy is used at the second step, the image of which the feature is extracted is defined as blocks while the width and height of the image are reduced, for example two times, in order to increase the accuracy of the experiment. Then, the image of which the feature is extracted is set to the search range, in order to search the whole sections. Finally, while the left phase image of the image of which the feature is extracted is shifted on a basis of 0.001 in order to estimate a decimal displacement vector, hierarchical block matching is performed.

Finally, a hierarchical interpolation for motion estimation will be described.

Figure 8:
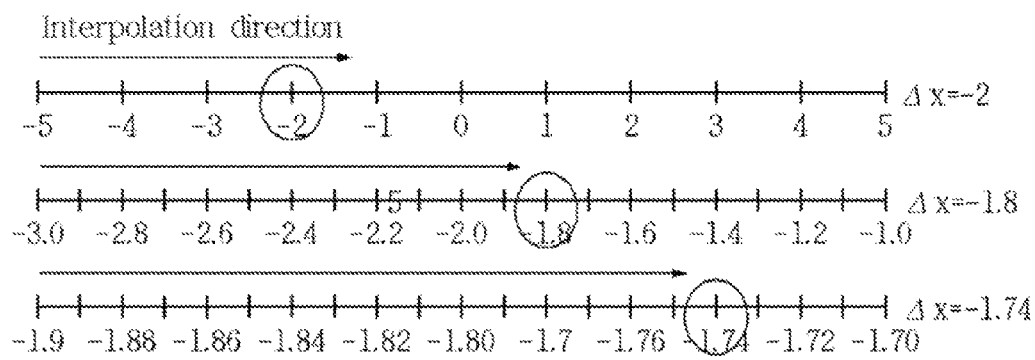
FIG. 8 is a diagram illustrating an hierarchical interpolation for motion estimation, according to an embodiment of the present invention.

FIG. 8 is a diagram illustrating the use of hierarchical interpolation for motion estimation, according to an embodiment of the invention.

Referring to FIG. 8, interpolation is performed to shift the left feature image $g_{Lf}(x, y)$ by one pixel in the range of [−5, 5]. Then, the displacement of the shifted image is calculated, and (Δx, Δy) which is the closest to (0, 0) is searched to estimate the motion of the image on a basis of one pixel.

When the minimum value of (Δx, Δy) is not (0, 0), the mean of two interpolated values which are the closest to (0, 0) is acquired as the final motion value. Then, the left feature image $g_{Lf}(x, y)$ shifted by an integer number of pixels is interpolated in the range of [−1, 1] on a basis of 0.1, and the minimum value of (Δx, Δy) is calculated.

That is, the decimal motion vector is estimated while the interpolation unit of the image is gradually reduced.

In the sensor, a light source is transmitted to the left areas of the pixels in all odd-numbered columns, and light is formed in the right areas of the pixels in all even-numbered columns. Thus, in the present embodiment, the image is shifted only along the x-axis, the motion estimation result also reflects only Δx, and Δy is already defined in the camera module.

As described above, the auto-focus system according to an embodiment of the present invention may detect a feature resistant to low luminance and out-of-focus blur, use the photodiodes as a sensor for acquiring a phase difference, and acquire the motion results of two phase images in order to move a length. Thus, the image may become resistant to an external impact and an optical axis of light which is reflected from the object and transmitted to the sensor.

The auto-focus system according to an embodiment of the present invention, can more accurately measure the displacement by which the lens is to be moved. Thus, the auto-focus system can acquire an in-focused image resistant to an optical axis and external impact in the low-luminance environment. In this aspect, the auto-focus system can acquire a phase difference using only pixels covered with a black mask without an additional sensor. Thus, the auto-focus system can be mounted in a hybrid auto-focus system and provide convenience during an in-focus image acquisition process.

According to an embodiment of the present invention, the auto-focus system and method can extract a reliable phase difference image from a low-luminance defocused image.

Furthermore, since the auto-focus system and method estimates a motion by extracting a strong feature from a phase difference image, the auto-focus system and method can rapidly calculate a phase difference in a low-luminance environment.

Furthermore, since the auto-focus system and method accurately and rapidly calculate a phase difference, the auto-focus system and method can minimize repetitive motions of the lens for an in-focus state.

Furthermore, since the auto-focus system and method minimizes repetitive motions of the lens, the auto-focus system and method can rapidly set an in-focus state.

Although various embodiments have been described for illustrative purposes, it will be apparent to those skilled in the art that various changes and modifications may be made without departing from the spirit and/or scope of the invention as defined in the following claims.

What is claimed is:

1. An auto-focus system for a digital electronic device that adjust focus by lens shift comprising:

a sensing unit suitable for sensing an image; and an auto-focus control unit suitable for extracting first and second phase images having a phase difference from the image sensed by the sensing unit, extracting a strong feature image from the first and second phase images, and estimating a motion vector used for the lens shift to adjust focus from the feature image, wherein the auto-focus control unit comprises:

a feature extraction unit suitable for acquiring a first difference image and a second difference image by applying a Difference of Gaussian scheme and a difference scheme between images reconstructed by a pyramid method to any one of the first and second phase images, acquiring coordinate of a predefined area by summing the first and second difference images, and extracting the feature image corresponding to the coordinate from the first and second phase images.

2. The auto-focus system of claim 1, wherein the auto-focus control unit is suitable for extracting the feature image satisfying a preset reference with respect to noise and out-of-focus blur.

3. The auto-focus system of claim 1, wherein the auto-focus control unit further comprises:

a phase difference image extraction unit suitable for selecting a predetermined interest area in the image sensed by the sensing unit, and extracting the first and second phase images by taking an image of an measuring point position based on an image of the interest area and a predefined measuring point pattern image and sampling the image of the measuring point position; and a motion estimation unit suitable for estimating the motion vector used for the lens shift to adjust focus from the feature image.

4. The auto-focus system of claim 3, wherein the phase difference image extraction unit comprises:

an interest area setting unit suitable for setting the interest area having a predefined position and size in the image;

an operation unit suitable for taking the image of the measuring point position based on the image of the interest area and the measuring point pattern image; and an image sampling unit suitable for acquiring the first and second phase images by sampling the image of the measuring point position.

5. The auto-focus system of claim 1, wherein the feature extraction unit is suitable for acquiring the first difference image being resistant to noise and the second difference image being resistant to out-of-focus blur.

6. The auto-focus system of claim 1, wherein the feature extraction unit is suitable for acquiring the coordinate of the predefined area having a strong feature using the first and second difference images.

7. The auto-focus system of claim 1, wherein the feature extraction unit comprises:

a Difference of Gaussian (DoG) unit suitable for acquiring the first difference image by applying the Difference of Gaussian (DoG) scheme to the first phase image;

a multi-scale image difference unit suitable for acquiring the second difference image by applying the difference scheme between images reconstructed by a pyramid method to the first phase image;

an arithmetic unit suitable for summing the first difference image and the second difference image and acquiring the coordinate of the predefined area; and a feature image generation unit suitable for extracting the feature image including first and second feature images corresponding to the coordinate from the first and second phase images.

8. The auto-focus system of claim 1, wherein the motion estimation unit is suitable for estimating the motion vector using at least one of phase correlation, block matching, and hierarchical interpolation, in response to the feature image.

9. The auto-focus system of claim 1, wherein the sensing unit comprises a sensor including pixels which have a Bayer Color Filter Array (CFA) pattern, and the sensor is set to use all pixels as measuring points for acquiring a phase image.

10. The auto-focus system of claim 9, wherein the pixel comprises:

a microlens suitable for transmitting light;

a black mask suitable for blocking a part of the light; and a photodiode suitable for receiving the light of which the part is blocked by the black mask.

11. The auto-focus system of claim 10, wherein the black mask is arranged to be symmetrical between an odd-numbered pixel and an even-numbered pixel in one direction.

12. An auto-focus method for a digital electronic device that adjust focus by lens shift comprising:

extracting first and second phase images having a phase difference from an image sensed by a sensing unit;

extracting a strong feature image from the first and second phase images;

estimating a motion vector used for the lens shift to adjust focus from the feature image; and performing the lens shift to adjust focus using the motion vector, wherein the extracting of the feature image comprises:

acquiring a first and difference images by applying a Difference of Gaussian scheme and a difference scheme between images reconstructed by a pyramid method to any one of the first and second phase images;

acquiring coordinate of a predefined area by summing the first and second difference images; and extracting the feature image corresponding to the coordinate from the first and second phase images.

13. The auto-focus method of claim 12, wherein the extracting of the phase image comprises:

selecting a predefined interest area in the image; and extracting first and second phase images in response to an image of the interest area and a predefined measuring point pattern image.

14. The auto-focus method of claim 12, wherein the extracting of the phase images comprises:

reconstructing the image into an image of an interest area having a predefined position and size;

acquiring an image of an measuring point position based on the image of the interest area and the measuring point pattern image; and acquiring the first and second phase images by sampling the image of the measuring point position.

15. The auto-focus method of claim 12, wherein the extracting of the feature image comprises extracting the feature image which satisfies a preset reference with respect to noise and out-of-focus blur, from the phase images.

16. The auto-focus method of claim 12, wherein the first difference image is suitable for being resistant to noise and the second difference image is suitable for being resistant to out-of-focus blur.

17. The auto-focus method of claim 12, wherein the predefined area is an area having a strong feature.

18. The auto-focus method of claim 12, wherein the extracting of the feature image comprises:
- acquiring a first difference image by applying the Difference of Gaussian (DoG) scheme to the first phase image;
- acquiring a second difference image by applying the difference scheme between images reconstructed by a pyramid method to the first phase image;
- acquiring the coordinate of the predefined area strong based on the first and second difference images; and
- extracting the feature image including first and second feature images corresponding to the coordinate from the first and second phase images.

19. The auto-focus method of claim 12, wherein the estimating of the motion vector comprises estimating the motion vector in the feature image, using at least one of phase correlation, block matching, and hierarchical interpolation.

* * * * *